United States Patent
Kromm et al.

(10) Patent No.: US 10,052,731 B2
(45) Date of Patent: Aug. 21, 2018

(54) FLYCUTTER HAVING FORCED AIR CLEANING

(71) Applicant: Syntec Optics, Rochester, NY (US)

(72) Inventors: Ryan Kromm, Macedon, NY (US); Steven Polvinen, Clarence, NY (US)

(73) Assignee: Syntec Optics, Rochester, NY (US)

( * ) Notice: Subject to any disclaimer, the term of this patent is extended or adjusted under 35 U.S.C. 154(b) by 105 days.

(21) Appl. No.: 15/267,176

(22) Filed: Sep. 16, 2016

(65) Prior Publication Data
US 2018/0079042 A1   Mar. 22, 2018

(51) Int. Cl.
| | |
|---|---|
| *B23Q 11/10* | (2006.01) |
| *B23Q 11/00* | (2006.01) |
| *B23C 3/13* | (2006.01) |
| *B23C 5/06* | (2006.01) |

(52) U.S. Cl.
CPC .............. *B23Q 11/005* (2013.01); *B23C 3/13* (2013.01); *B23C 5/06* (2013.01); *B23C 2220/28* (2013.01); *B23C 2226/31* (2013.01); *B23C 2226/61* (2013.01)

(58) Field of Classification Search
CPC .... B23C 3/13; B23C 5/06; B23C 5/08; B23C 2210/244
See application file for complete search history.

(56) References Cited

U.S. PATENT DOCUMENTS

| | | | |
|---|---|---|---|
| 4,322,189 A * | 3/1982 | Briese | B23Q 1/0036 407/11 |
| 4,655,005 A | 4/1987 | Roberts | |
| 5,620,286 A | 4/1997 | Youden | |
| 5,704,735 A * | 1/1998 | Moreau | B23C 5/165 407/33 |
| 6,147,764 A | 11/2000 | Handa | |
| 9,216,486 B2 | 12/2015 | Mandler | |

FOREIGN PATENT DOCUMENTS

| | | | | |
|---|---|---|---|---|
| JP | 01210244 A | * | 8/1989 | ........... B23Q 11/005 |
| JP | 11287611 A | * | 10/1999 | |
| JP | 4821125 B2 | * | 11/2011 | ............... B23C 5/08 |

OTHER PUBLICATIONS

English Translation of JP H01-210244, Aug. 1989.*
English Translation of JP H11-287611, Oct. 1999.*
English Translation of JP 4821125, Nov. 2011.*

* cited by examiner

*Primary Examiner* — Alan Snyder
(74) *Attorney, Agent, or Firm* — Louis S. Horvath (57) ABSTRACT

An apparatus for machining a workpiece has a spindle actuable to rotate about an axis, with a flycutter wheel mounted to the spindle. At least one cutting tool is coupled to the flycutter wheel and disposed to score a workpiece during rotation of the flycutter wheel. A translation mechanism is disposed to urge the workpiece into the path of the at least one cutting tool. A compressed gas delivery system is actuable to force a flow of gas through the spindle and through one or more conduits formed within the flycutter wheel to the at least one cutting tool.

12 Claims, 8 Drawing Sheets

Section A-A

FLYCUTTER HAVING FORCED AIR CLEANING

FIELD OF THE INVENTION

This disclosure generally relates to parts machining and more particularly relates to a flycutter for surface finishing having integral forced air cooling and cleaning.

BACKGROUND OF THE INVENTION

The flycutter is a familiar apparatus for finish machining, providing extremely fine surface conditioning of metal and other hard substrates. The flycutter apparatus has a rotatable flywheel, also termed a flycutter plate or flycutter wheel, with an attached tool that repeatedly scores the surface of a workpiece, slowly advancing the workpiece into the tool path along a slide mechanism to achieve a highly precise finish. Typically fitted with a diamond tool, the cutting, scoring, or scribing action of the flycutter obtains a highly polished surface with roughness precision that can be at sub micron levels. With crystals and non ferrous metals, the flycutter action not only removes material as it is scored, but can be inherently self-cleaning, wherein the particulate is continually swept away from the tool point and surface by the cutting action as finishing proceeds.

With recent advances in diamond tool fabrication and use, the flycutter apparatus has been adapted for use in finishing of precision optical devices that require ultra-flat and smooth surfaces. For optical finishing, however, unlike its use with metals and crystalline materials, the flycutter tool and workpiece surface can be exceedingly difficult to keep clean. The high speed spinning action of the flycutter, with typical ranges of 1500 RPM and higher, tends to cause a vacuum. Filings and other particulate and residue from the machining process, generally termed "swarf", can be sucked inwards, toward the axis of rotation. This problem can be particularly troublesome with optical materials such as poly(methyl methacrylate) (PMMA), polystyrene, cyclic olefin, polyetherimide and other amorphous polymers. Since the diamond cutting tool and polymer workpiece are electric insulators, the friction between the tool and workpiece, during scission, generates static and heat. This results in a fine, static charged swarf which is difficult to remove from the workpiece and tooling.

Some of the conventional swarf removal methods, such as cutting fluids, are not applicable to polymers. Some polymers are hygroscopic, for example, and can be damaged by emulsified oil or solvent mist. With polymer optics, such contaminants may not affect surface finish, but would negatively affect the durability and performance of optical coatings applied to finished parts. Thus, there is a need for removal mechanisms that can effectively cool and clean the cutting diamond as well as keep the cutting surface clear of swarf or other residue in order to provide uniform form and finish, particularly for optical polymer materials.

SUMMARY OF THE INVENTION

It is an object of the present invention to advance the art of precision polymer finishing. It is a feature of the present invention that it provides a continuous flow of compressed air or other cleaning gases, for cleaning and neutralization of static charge, to the cutting tool and to the finish surface, allowing tooling of a highly precise, polished surface. Advantageously, the addition of this feature to existing systems does not change the footprint or shape of the flywheel and can reduce the overall weight of the flywheel.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an apparatus for machining a workpiece, the apparatus comprising:

a spindle actuable to rotate about an axis;
a flycutter wheel mounted to the spindle;
at least one cutting tool coupled to the flycutter wheel and disposed to score a workpiece during rotation of the flycutter wheel;
a translation mechanism disposed to urge the workpiece into the path of the at least one cutting tool;
and
a compressed gas delivery system that is actuable to force a flow of gas through the spindle and through one or more conduits, formed within the flycutter wheel, to the at least one cutting tool.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other. Some exaggeration may be necessary in order to emphasize basic structural relationships or principles of operation. Some conventional components that would be needed for implementation of the described embodiments, such as support components used for providing power, for control and safety systems, and for mounting and translating a workpiece, for example, may not be shown in the drawings in order to simplify description.

DETAILED DESCRIPTION OF THE INVENTION

The following is a detailed description of the preferred embodiments, reference being made to the drawings in which the same reference numerals identify the same elements of structure in each of the several figures.

Where they are used in the context of the present disclosure, the terms "first", "second", and so on, do not necessarily denote any ordinal, sequential, or priority relation, but are simply used to more clearly distinguish one step, element, or set of elements from another, unless specified otherwise.

As used herein, the term "energizable" relates to a device or set of components that perform an indicated function upon receiving power and, optionally, upon receiving an enabling signal.

In the context of the present disclosure, the machining or tooling action of the flycutter point against the surface of a workpiece can be equivalently described as cutting, scoring, or scribing. With each rotation of the flycutter wheel, each of the cutting tools on the flywheel scores the workpiece surface along the arcuate path of wheel rotation. With flycutter actuation at speeds of hundreds or thousands of rotations per minute, this tooling action conditions the workpiece to provide a finished surface of desired smoothness and precision.

Figure 1A:
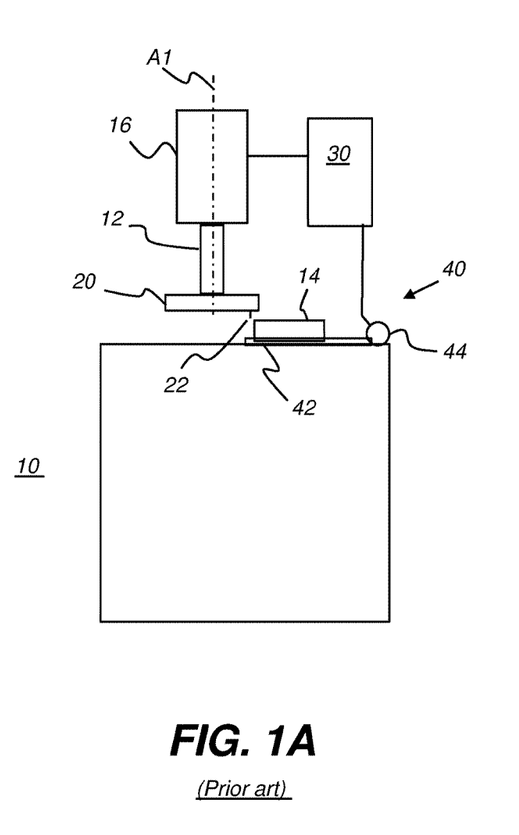
FIG. 1A is a schematic diagram that shows components of a flycutter wheel cutter apparatus.

FIG. 1A is a simplified schematic diagram showing components of a conventional flywheel cutter apparatus 10. A spindle 12, actuated by a motor 16, rotates about an axis A1. A flycutter wheel 20, alternately termed a flycutting head, with one or more cutting tools 22, is attached to spindle 12. Cutting tool 22, traveling in an arcuate path with rotation of flycutter wheel 20, repeatedly cuts, scores, or scribes the surface of a workpiece 14 to condition the workpiece 14 surface. A translation mechanism 40 urges workpiece 14 incrementally forward, into the path of revolving tool 22, in order to provide a finished surface as a result of the scoring action. Translation mechanism 40 typically provides some type of slide 42, driven forward using a motor or other actuator 44. A control logic processor 30 typically provides synchronization and control logic for setting and coordinating rotational and translation speeds, which may vary according to the type of material being finished.

Figure 1B:
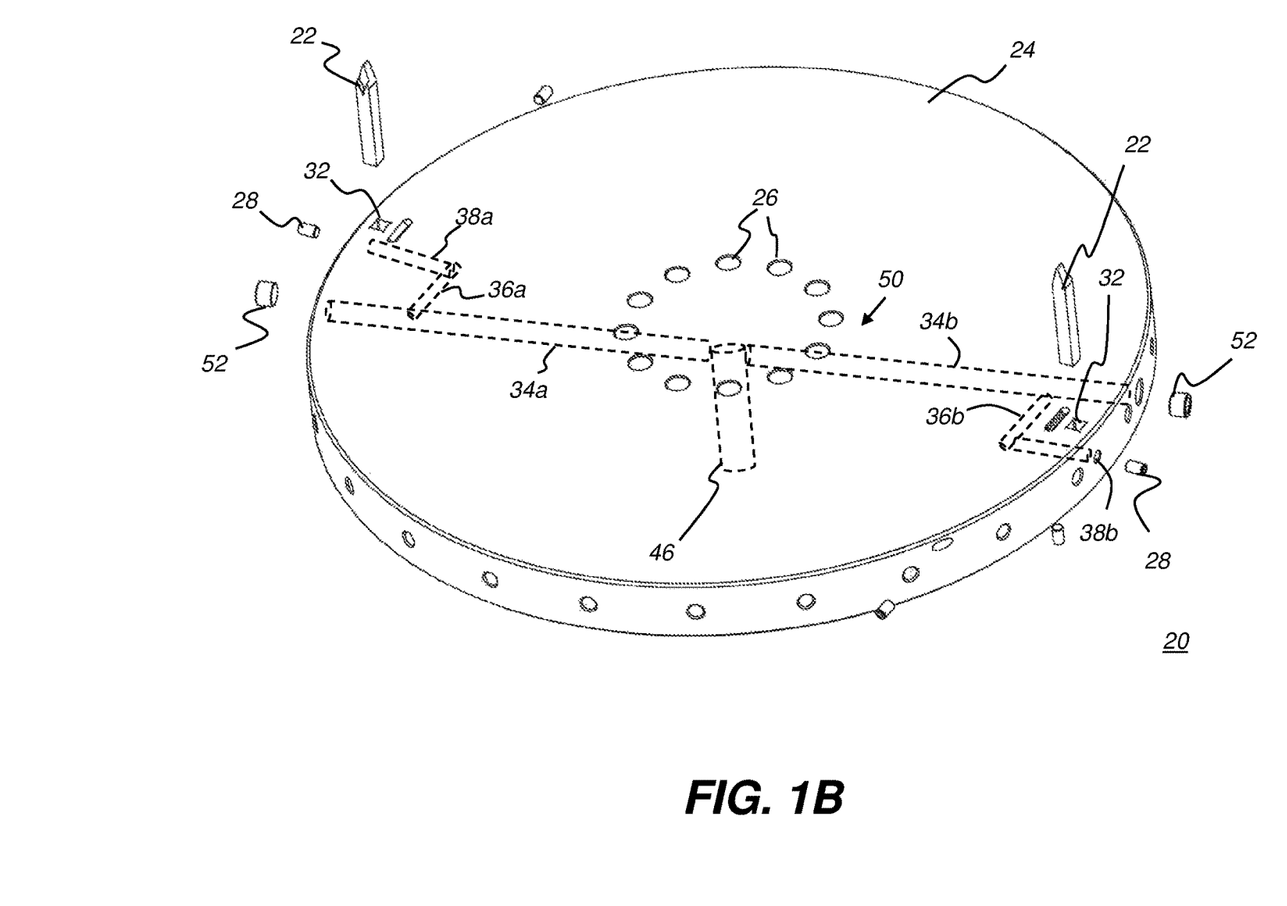
FIG. 1B is a perspective view of a flycutter wheel adapted to provide a continuous gas flow to the cutting tool according to an embodiment of the present disclosure.
Figure 1C:
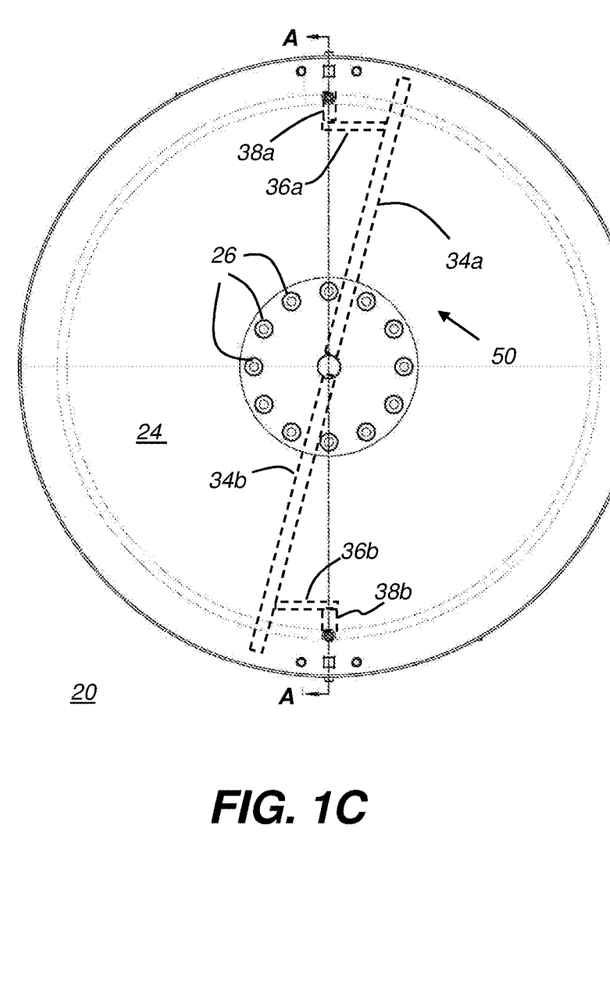
FIG. 1C shows a plan view of the flycutter wheel of FIG. 1B.
Figure 1D:
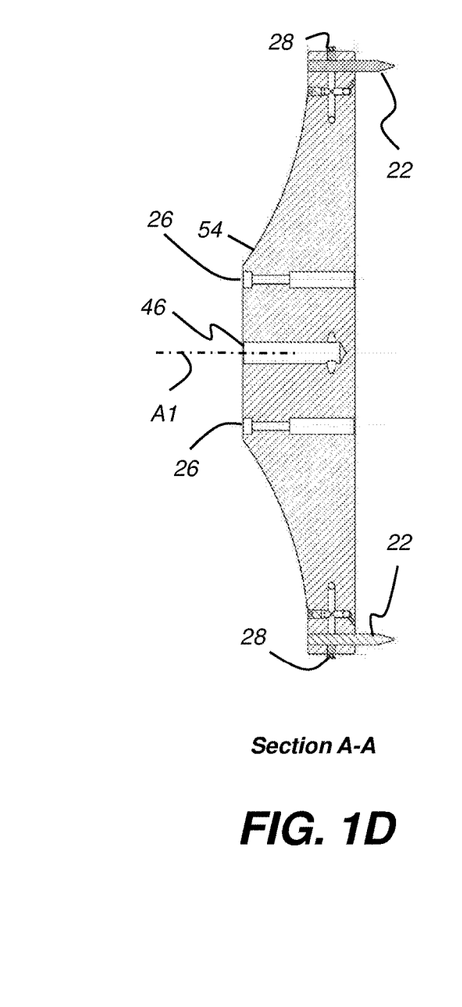
FIG. 1D shows a section view of the flycutter wheel of FIG. 1C.

The perspective view of FIG. 1B and plan and cross-section views of FIGS. 1C and 1D show the flat cutting face 24 of flycutter wheel 20 according to an embodiment of the present disclosure. Holes 26 formed in a central portion of wheel 20 hold fasteners (not shown) for fitting to the spindle on the reverse face 54. Two cutting tools 22 are shown, each held in place in a respective cavity 32 by one or more fasteners 28. Within flycutter wheel 20 and shown in dashed lines where hidden are a series of conduits 46, 34a, 36a, 38a, 34b, 36b, and 38b, whose function as part of a compressed gas delivery system 50 is described in more detail subsequently. End caps 52 can also be provided for sealing conduits 34a and 34b. Conduits can be formed by drilling and sealing, for example. Alternately, conduits can be formed using tubing routed within cavities formed in wheel 20.

Figure 2:
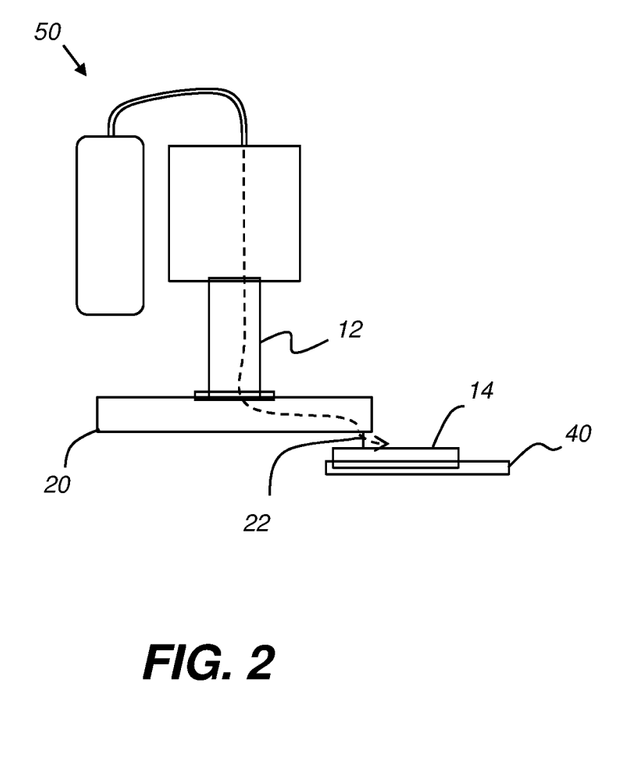
FIG. 2 is a schematic diagram that shows how compressed gas delivery system of the present disclosure operates to provide a gas flow against each cutting tool.

FIG. 2 is a schematic diagram that shows how compressed gas delivery system 50 operates to provide a gas flow against each cutting tool 22. The general direction of gas flow for one cutting tool 22 is shown by a dashed line. A compressor 48 or other compressed gas source such as a pressurized tank directs a compressed air or other gas through spindle 12 and against cutting tool 22 through internal conduits 46, 34a, 36a, 38a, 34b, 36b, and 38b shown in FIGS. 1B and 1C. Advantageously, as flycutter wheel 20 rotates and tool 22 revolves about axis A1 at high speeds to repeatedly score the workpiece surface, the gas flow driven against tool 22 is maintained, continuously providing a cooling current of air or other gas against the tool. This pressurized current of gas also helps to force cutting residue away from the tool contact point in order to continuously clear the workpiece 14 surface that is being scribed. The functions of the pressurized gas flow include cooling of cutting tool and workpiece surface and temperature stabilization as well as clearing of swarf and cutting debris in general from the cutting point. Advantageously, the air flow against the cutting tool can be continuous and continuously directed at the same angle with respect to the tool.

Figure 3A:
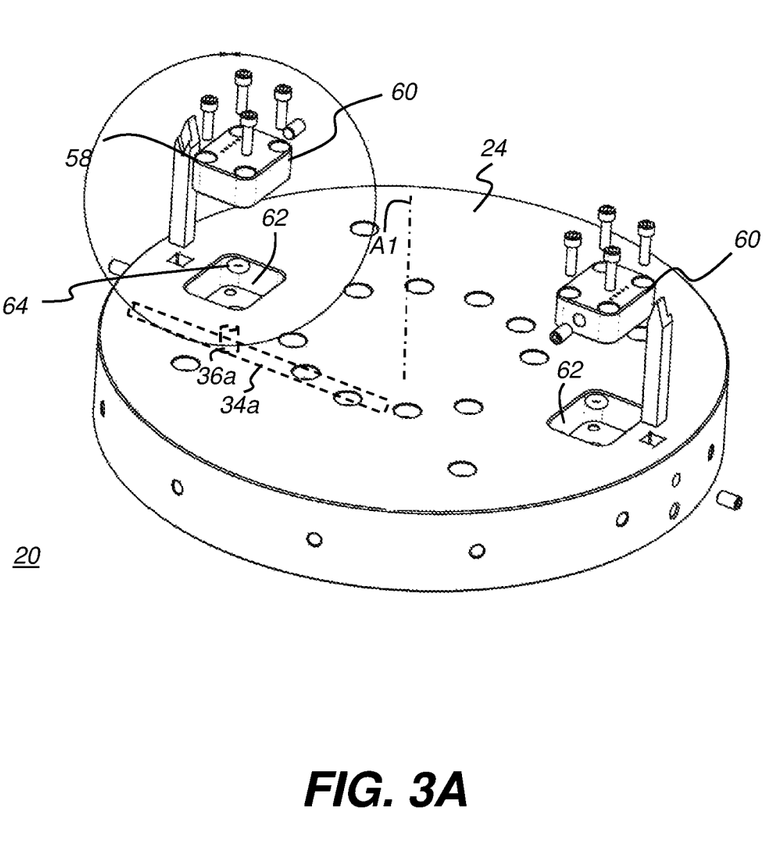
FIG. 3A is a perspective view showing the flycutter wheel with a modular distribution block for controlled output of compressed gas.
Figure 3B:
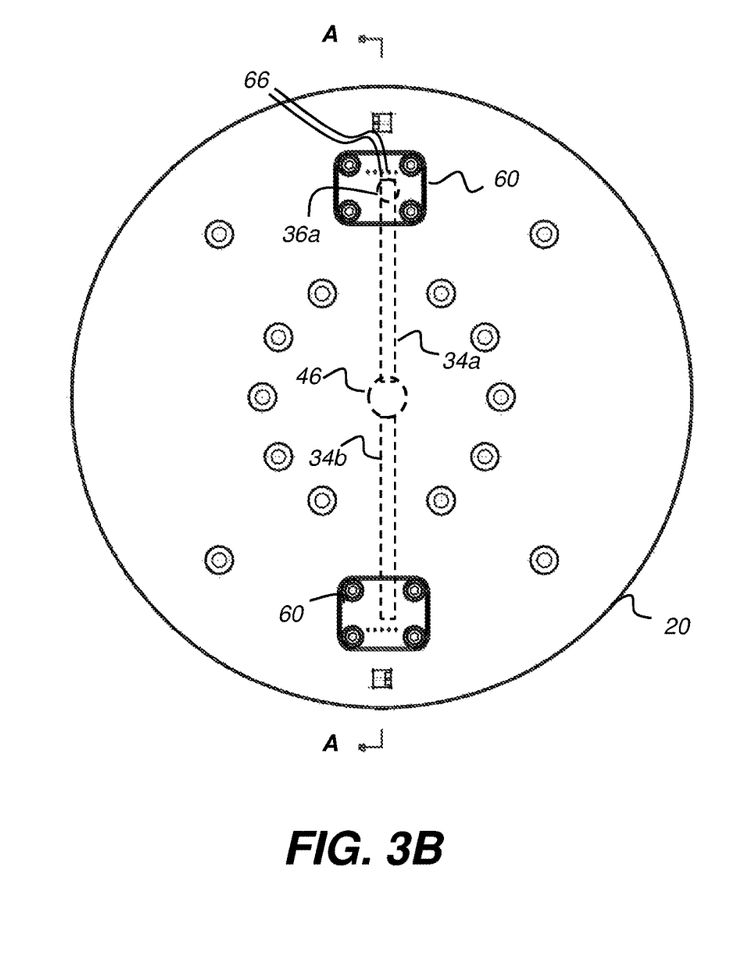
FIG. 3B shows a plan view of the flycutter wheel of FIG. 3A.
Figure 3C:
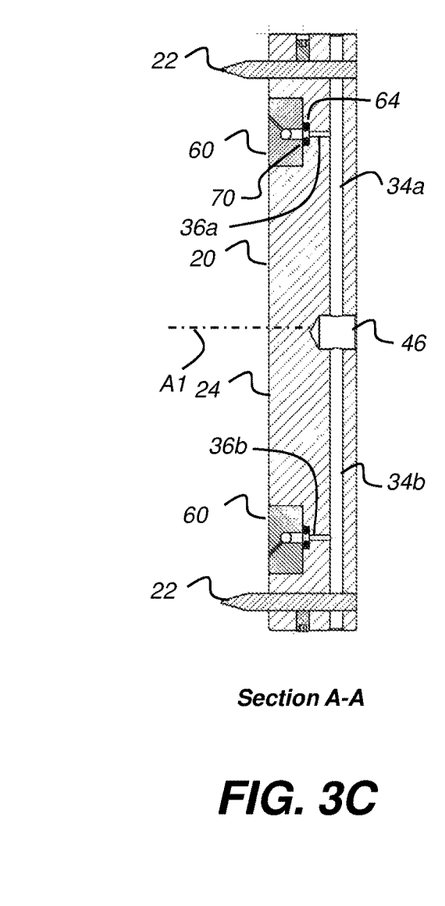
FIG. 3C shows a section view of the flycutter wheel of FIG. 3A.
Figure 3D:
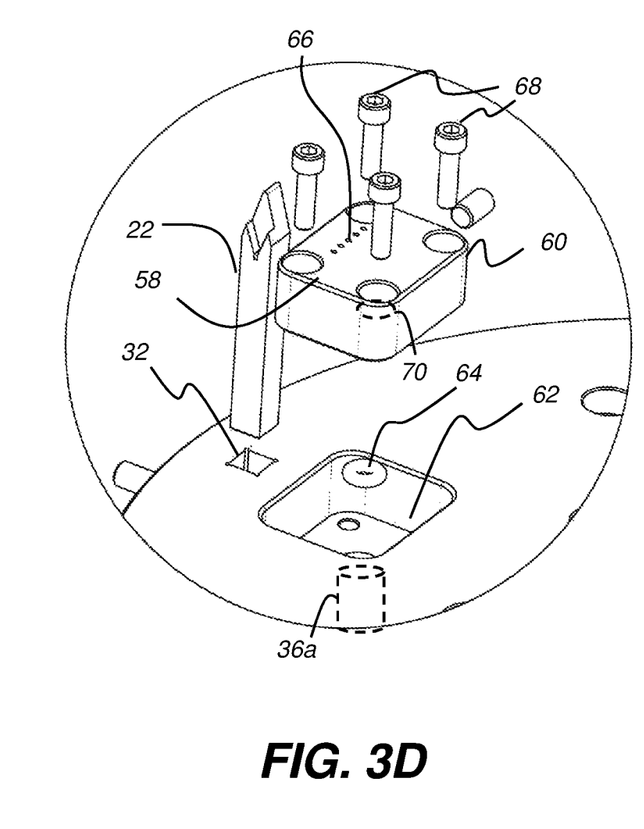
FIG. 3D is a perspective view that shows a distribution block with component parts.

FIG. 3A is a perspective view showing flycutter wheel 20 with one or more modular distribution blocks 60 for controlled output of compressed gas according to an embodiment of the present disclosure. FIG. 3B shows a plan view and FIG. 3C shows a section view of the flycutter wheel of FIG. 3A. FIG. 3D shows an enlarged view of distribution block 60 and a number of its component parts. Distribution block 60 can be a solid component, appropriately drilled with conduits for directing gas flow. A faceplate 58 is simply the surface of block 60 that provides the gas exhaust nozzles. Alternately, distribution block 60 can be substantially a hollow box structure with a removable faceplate 58 and can mount within a cavity 62 from the side of cutting face 24. Faceplate 58 is mounted flush to cutting face 24. At the junction between an input port 70 and conduits 36a or 36b, respectively, an O-ring 64 or other sealing element can be provided. One or more exhaust ports 66 or nozzles formed on faceplate 58 surface of distribution block 60 direct the pressurized flow towards tool 22 and its contact point along the workpiece. One or more adjustable fasteners such as set screws (not shown) or other valve devices can be provided at ports 66 to constrict gas flow or block corresponding ports 66 in order to provide a measure of control over the flow pressure or rate.

Distribution block 60 can be a modular component, configured with a number of different removable or replaceable faceplates 58, each formed with an arrangement of ports 66 that are particularly suitable for a corresponding substrate material to be finished. Separate replaceable faceplates 58 or different distribution blocks 60 can be designed for finishing an aluminum surface or for finishing optical polymers, for example. The port 66 arrangement on the faceplate 58 surface can be suitably configured to continually direct air radially outward, circumferentially with rotation, or in other suitable directions. Optionally, distribution of compressed gas can be directly output through a cavity formed in the flycutter wheel 20 or formed, then provided with a faceplate 58 at the mouth of the cavity, providing ports 66.

Figure 4:
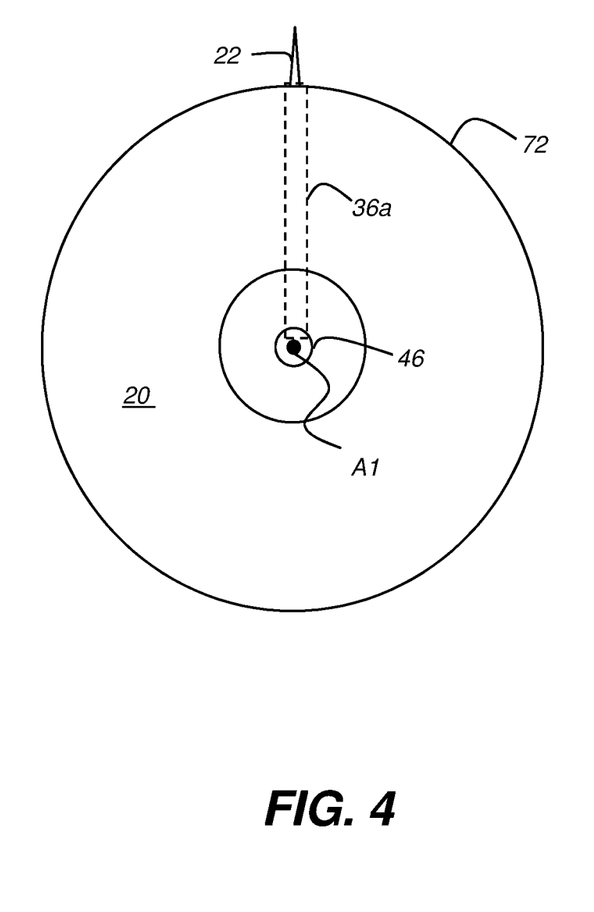
FIG. 4 shows an alternate embodiment for a raster flycutter wheel using internally directed compressed gas cooling.

FIG. 4 shows an alternate embodiment for a raster flycutter wheel 20 using internally directed compressed gas cooling. In this embodiment, cutting tool 22 is mounted to a curved surface 72 of the flycutter wheel. The flow of compressed gas is centrifugal to rotation axis A1.

Air can be used as the compressed gas provided for tool cooling and cleaning of swarf from the tool and removal of cutting debris from the work area. Other gas types can be used with this system, including nitrogen, for example. The temperature of the gas can be modulated to optimize cooling or other effect. Because the gas flow can be directed continuously to the cutting tool as the flycutter wheel rotates, thermal stability of the tool and workpiece can be improved over conventional flycutter applications, thereby allowing improved precision.

Although embodiments of the present disclosure have been described for machining optical polymers, it should be noted that the flycutter apparatus can be used for any of a number of types of workpiece substrates, including various types of glass, ceramics, composite materials, crystalline materials, and metals such as aluminum, steel, copper, nickel, and various alloys.

Embodiments of the present disclosure can provide gas pressure for swarf removal, cooling, and reduction of static charge for flycutter apparatus systems that use one, two, or more than two tools, such as diamond cutting tools, for example. Tool types, heights, and other settings can be varied in order to provide coarser or finer finish passes over the surface, or both passes consecutively for example. Unlike conventional approaches that may provide stationary compressed air sources that are continuously directed to the workpiece surface from a fixed direction, embodiments of the present disclosure can continuously direct air to the cutting or scoring tool, helping to reduce heat and friction.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An apparatus for machining a workpiece, the apparatus comprising:
   a) a spindle actuable to rotate about an axis;
   b) a flycutter wheel mounted to the spindle and having a flat facing surface that is disposed to face the workpiece and having one or more cutting tools, wherein each cutting tool is seated within a corresponding cutting tool cavity formed into the flat facing surface and has a tool contact point that extends toward the workpiece surface;
   c) a compressed gas delivery system that is actuable to force a flow of gas through the spindle and into the flycutter wheel to a central internal conduit that is centered about the axis,
   wherein the compressed gas delivery system provides a separate path for gas flow from the central internal conduit to each of the one or more cutting tools by providing each corresponding cutting tool with:
      an internal radial conduit that is formed within the wheel and extends radially from the central internal conduit toward the corresponding cutting tool cavity;
      a gas distribution cavity for the corresponding cutting tool, formed into the flat facing surface, spaced apart from the corresponding cutting tool cavity, and spaced apart along the flat facing surface from the central internal conduit, wherein the gas distribution cavity receives the gas flow from the corresponding internal radial conduit;
      a removable faceplate for the corresponding cutting tool that seats against the corresponding gas distribution cavity for the cutting tool, wherein the removable faceplate has a plurality of exhaust ports disposed to redirect gas flow from its corresponding gas distribution cavity toward the corresponding tool contact point;
   and
   d) a translation mechanism disposed to urge the workpiece into the path of the one or more cutting tools.

2. The apparatus of claim 1 wherein the flat facing surface is parallel to the workpiece surface that is machined by the one or more cutting tools.

3. The apparatus of claim 1 wherein at least one of the removable faceplates further has an adjustment fitting that controls the rate of gas flow from one or more of the plurality of exhaust ports.

4. The apparatus of claim 1 wherein the compressed gas is air.

5. The apparatus of claim 1 wherein the compressed gas is nitrogen.

6. The apparatus of claim 1 wherein the cutting tools are diamond cutting tools.

7. The apparatus of claim 1 wherein the central internal conduit is formed into a surface of the flycutter wheel that is opposite to the flat facing surface of the flycutter wheel.

8. The apparatus of claim 1 wherein the faceplate mounts flush to the flat facing surface.

9. An apparatus for machining a workpiece, the apparatus comprising:
   a) a spindle actuable to rotate about an axis;
   b) a flycutter wheel mounted to the spindle and having:
      (i) a flat cutting face that is disposed to face the workpiece and a reverse surface opposite the cutting face and facing the spindle,
      (ii) a central internal conduit that is centered about the axis and forms a central cavity extending into the reverse surface and behind the flat cutting face,
      (iii) a first cutting tool seated within a first cutting tool cavity formed into the flat cutting face and having a first gas distribution apparatus, and a second cutting tool seated within a second cutting tool cavity formed into the flat cutting face and having a second gas distribution apparatus,
      wherein each corresponding gas distribution apparatus for each respective cutting tool has:
         an internal radial conduit that is formed within the flycutter wheel and that extends radially from the central internal conduit toward the corresponding cutting tool cavity,
         a gas distribution cavity formed into the flat cutting face and spaced apart from the corresponding cutting tool cavity and from the central internal conduit,
         wherein the gas distribution cavity connects to the corresponding internal radial conduit,
         a removable faceplate that seats against the corresponding gas distribution cavity for the cutting tool, wherein the removable faceplate has a plurality of exhaust ports formed to direct gas flow against the workpiece;
   c) a source of compressed gas that is actuable to force gas flow through the spindle and into the central internal conduit and radially outward for distribution to the respective gas distribution apparatus for each cutting tool;
   and
   d) a translation mechanism disposed to urge the workpiece into the path of the first and second cutting tools.

10. The apparatus of claim 9 wherein one or more of the conduits are formed by drilling.

11. A method for machining a workpiece, the method comprising:
   coupling a first cutting tool to a flycutter wheel within a first tool cavity on a flat cutting surface of the flycutter wheel;
   coupling a second cutting tool to the flycutter wheel within a second tool cavity on the flat cutting surface, wherein the second tool cavity is spaced apart from the first tool cavity;

directing a flow of compressed gas along an axis of rotation through a spindle that is coupled to the flycutter wheel to a central conduit that is centered within the wheel about the axis of rotation;

conducting the flow of gas outward from the central conduit, through a first radially extending internal conduit that extends outward from the central conduit, within the flycutter wheel, to a first gas distribution cavity that is formed into the flat cutting surface;

exhausting the compressed gas against the first cutting tool through a first plurality of nozzles formed in a first distribution block that is coupled within the first gas distribution cavity;

conducting the flow of gas outward from the central conduit, through a second radially extending internal conduit that extends outward from the central conduit, within the flycutter wheel, to a second gas distribution cavity that is formed into the flat cutting surface;

exhausting the compressed gas against the second cutting tool through a second plurality of nozzles formed in a second distribution block that is coupled within the second gas distribution cavity;

repeatedly scoring the workpiece by rotating the flycutter wheel about the axis; and translating the workpiece in a direction parallel to the flycutter wheel surface.

12. The method of claim 11 wherein the first and second tool cavities are on opposite sides of the axis.

* * * * *